(12) United States Patent
Rapp

(10) Patent No.: US 7,083,151 B2
(45) Date of Patent: Aug. 1, 2006

(54) LATERALLY-REINFORCED DUCT SADDLE, AND METHOD FOR SUSPENDING HORIZONTAL FLEXIBLE DUCT

(76) Inventor: M. Scott Rapp, 4255 Walker Rd., Rock Hill, SC (US) 29730

( * ) Notice: Subject to any disclaimer, the term of this patent is extended or adjusted under 35 U.S.C. 154(b) by 2 days.

(21) Appl. No.: 10/870,516

(22) Filed: Jun. 17, 2004

(65) Prior Publication Data

US 2005/0279893 A1   Dec. 22, 2005

(51) Int. Cl.
*F16L 3/00*   (2006.01)
(52) U.S. Cl. .................. 248/60; 24/16 PB; 24/305 P; 248/903
(58) Field of Classification Search ............ 248/58, 248/59, 60, 62, 903; 24/16 PB, 30.5 P
See application file for complete search history.

(56) References Cited

U.S. PATENT DOCUMENTS

| | | | |
|---|---|---|---|
| 4,889,299 A | 12/1989 | Sarton et al. | |
| 5,005,789 A * | 4/1991 | Jones | 248/58 |
| 5,522,571 A * | 6/1996 | Simmons | 248/59 |
| 6,152,412 A * | 11/2000 | Basickes et al. | 248/317 |
| 6,557,805 B1 * | 5/2003 | Snyder | 248/60 |
| 6,595,471 B1 | 7/2003 | Botting | |
| 6,719,247 B1 | 4/2004 | Botting | |
| 2005/0028326 A1* | 2/2005 | Logan | 24/16 PB |
| 2005/0115028 A1* | 6/2005 | Cheung | 24/16 PB |

\* cited by examiner

*Primary Examiner*—Ramon O Ramirez
(74) *Attorney, Agent, or Firm*—Schwartz Law Firm P.C.

(57) ABSTRACT

A laterally-reinforced duct saddle is adapted for hanging a length of horizontal flexible duct from a supporting structure. The duct saddle includes a generally flat, elongated blank adapted for bending around and receiving a portion of the flexible duct. The blank has an intermediate region adapted for engaging the duct in an area of maximum vertical load. A plurality of lateral support ribs are variably spaced-apart from one end of the blank to the other. The ribs are more closely spaced within the intermediate region of the blank to provide maximum resistance against compression of the flexible duct in the area of maximum vertical load.

20 Claims, 7 Drawing Sheets

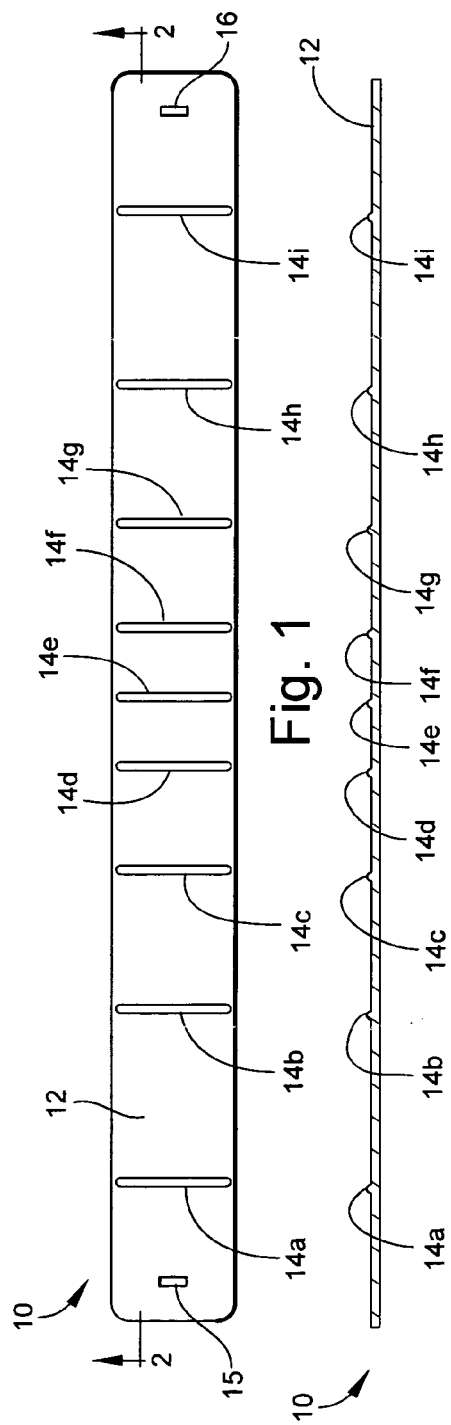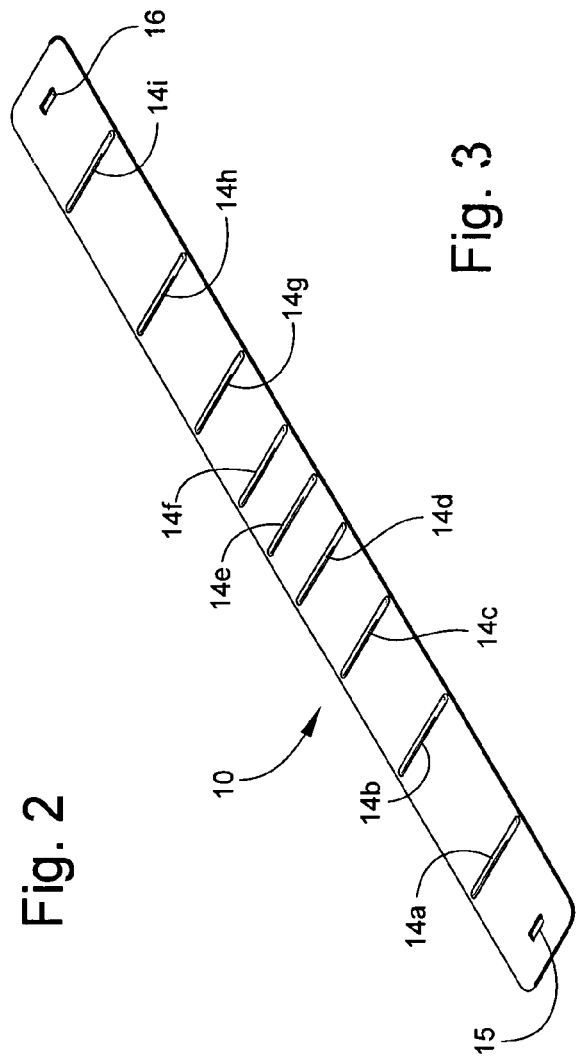

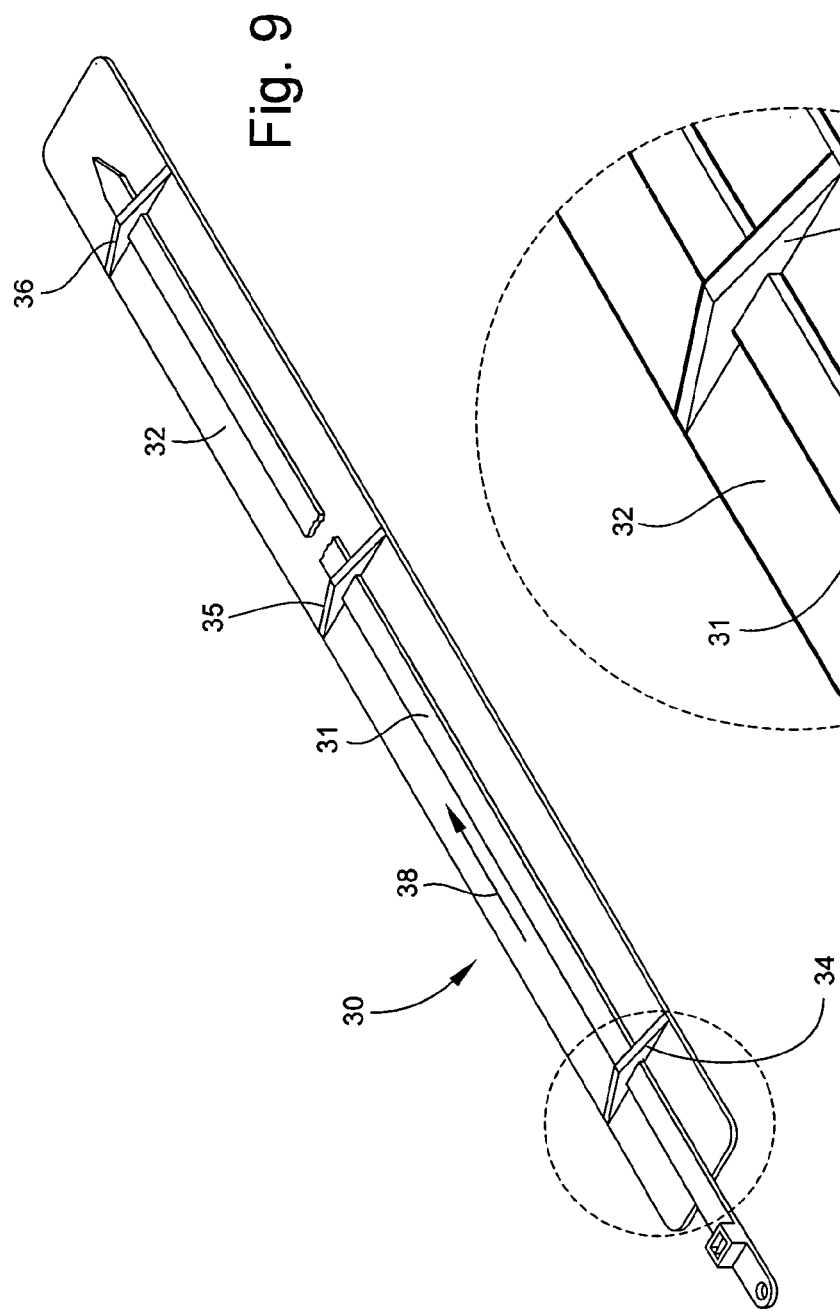

LATERALLY-REINFORCED DUCT SADDLE, AND METHOD FOR SUSPENDING HORIZONTAL FLEXIBLE DUCT

TECHNICAL FIELD AND BACKGROUND OF THE INVENTION

This invention relates to a laterally-reinforced duct saddle, and method for suspending horizontal flexible duct. The saddle of the present invention cooperates with standard duct tie to fully support the horizontal duct when hung in commercial and residential buildings. Alternatively, the saddle may comprise a generally J-shaped hanger which mounts directly to ceiling joists or other framing members. The invention substantially prevents compression of the duct at its various points of suspension, thereby improving the overall efficiency of the heating/cooling unit supplying conditioned air through the duct. The present invention is applicable for supporting all types of flexible duct work, including metallic, uninsulated; metallic, insulated; nonmetalic, uninsulated; and nonmetalic, insulated (lined).

Homes with central heating and air-conditioning systems rely on duct work to distribute warmed or cooled air throughout the house. If its duct system is poorly designed or poorly installed, a house will be wasting energy, no matter how well insulated it may be, or how efficient its furnace/air conditioner are.

Sagging, pinched, or crimped duct work cuts the amount of heat that can flow from the furnace to the rooms where it is needed. In addressing this problem, certain building codes and standards provide a maximum spacing of supports used to hang horizontal duck work, and a maximum allowable sag between supports. According to one standard, the horizontal duct must be supported at intervals not to exceed 5 feet with a maximum allowable duct sag of 1/2 inches per foot of spacing. In addition, the supporting element in contact with the flexible duct must be wide enough so it does not reduce the internal diameter of the duct when hung. These requirements have resulted in the use of relatively wide hangers or saddles designed to engage and carry the duct around its lower circumference. The wide support material is typically thin and flexible. When hanging large heavy duct work, this material is prone to failure along a lateral dimension causing a generally convex deformation of the support. This deformation ultimately results in increased sagging, pinching, or crimping of the horizontal flexible duct.

SUMMARY OF INVENTION

Therefore, it is an object of the invention to provide a laterally-reinforced duct saddle adapted for cooperating with standard duct tie to suspend horizontal flexible duct.

It is another object of the invention to provide a laterally-reinforced duct saddle which resists deformation along a lateral dimension.

It is another object of the invention to provide a laterally reinforced duct saddle which is thin and flexible.

It is another object of the invention to provide a laterally-reinforced duct saddle which relatively inexpensive to manufacture.

It is another object of the invention to provide a laterally-reinforced duct saddle which is quick and easy to install.

It is another object of the invention to promote efficient heating and cooling of commercial and residential buildings.

It is another object of the invention to prevent compression of horizontal flexible duct.

These and other objects of the present invention are achieved in the preferred embodiments disclosed below by providing a laterally-reinforced duct saddle adapted for hanging a length of horizontal flexible duct from a supporting structure. The duct saddle includes a generally flat, elongated blank adapted for bending around and receiving a portion of the flexible duct. The blank has an intermediate region adapted for engaging the duct in an area of maximum vertical load. A plurality of lateral support ribs are variably spaced-apart from one end of the blank to the other. The ribs are more closely spaced within the intermediate region of the blank to provide maximum resistance against compression of the flexible duct in the area of maximum vertical load.

According to another preferred embodiment, the blank defines opposing end openings adapted for receiving a flexible duct tie cooperating to hang the duct from the supporting structure.

According to another preferred embodiment, the blank is adapted for sliding position adjustment along a length of the duct tie.

According to another preferred embodiment, the blank is constructed of a flexible polymer.

According to another preferred embodiment, the ribs project from an inside major surface of the blank and are adapted for residing against the flexible duct.

According to another preferred embodiment, the ribs project from the inside major surface a distance greater than 0.125 inches.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is a view of an inside major surface of the laterally-reinforced duct saddle according to one preferred embodiment of the present invention;

FIG. 2 is a cross-sectional view taken substantially along line 2—2 of FIG. 1;

FIG. 3 is a perspective view of the duct saddle;

FIG. 9 is a perspective view of a laterally-reinforced duct saddle according to a second preferred embodiment of the present invention; and FIG. 10 is an enlarged view of the encircled area indicated in FIG. 9.

DESCRIPTION OF THE PREFERRED EMBODIMENT AND BEST MODE

Figure 4:
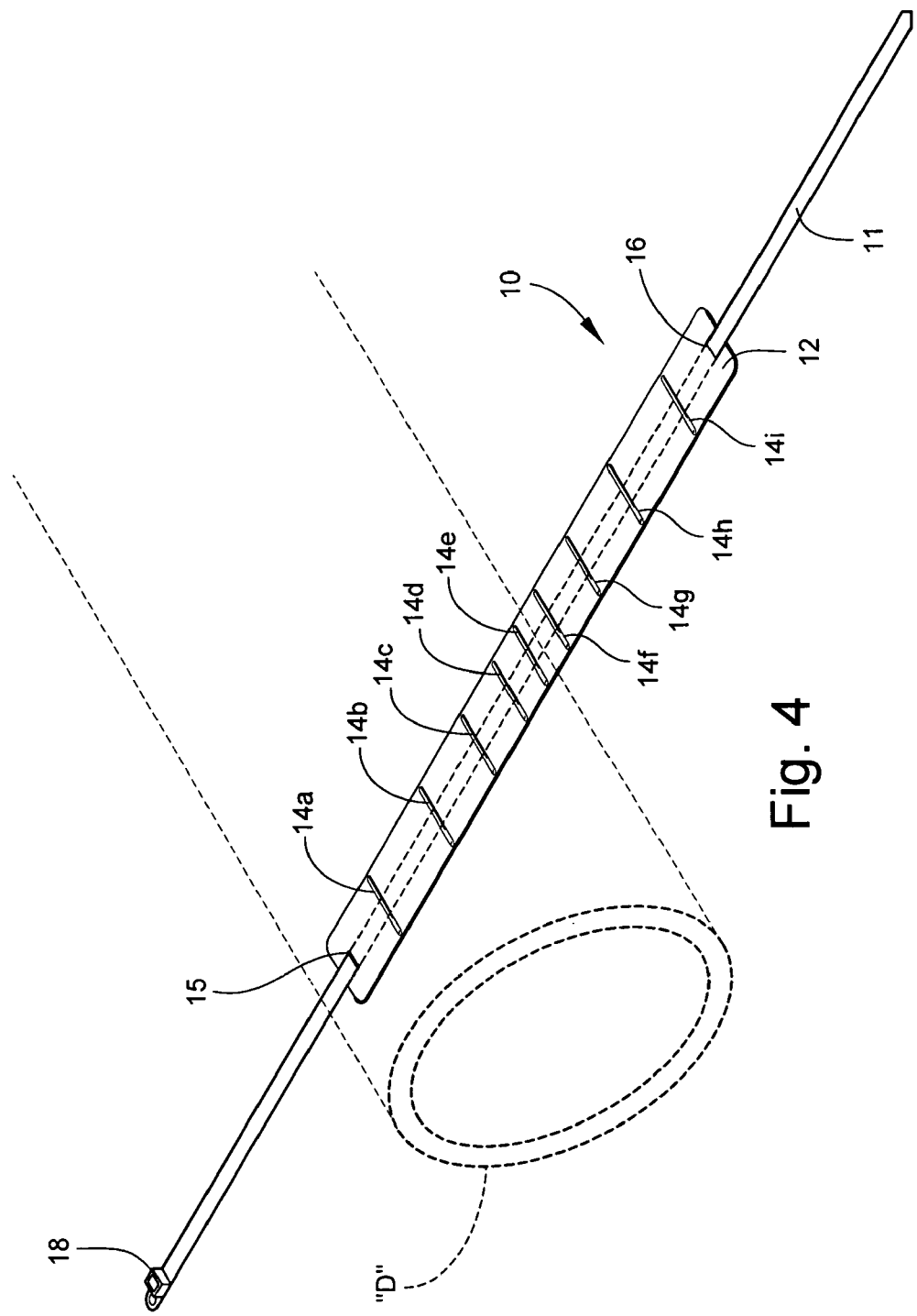
FIG. 4 is a view of the duct saddle applied to the duct tie and extended prior to bending around the horizontal flexible duct (shown in phantom)

Referring now specifically to the drawings, a laterally-reinforced duct saddle according to the present invention is illustrated in FIGS. 1–3, and shown generally at reference numeral 10. The saddle 10 is especially adapted for use in combination with a standard self-locking duct tie 11, shown in FIG. 4, applicable for hanging horizontal flexible air duct "D" in commercial and residential buildings. The duct tie 11 is preferably manufactured in UV-resistant, black nylon 6/6, and is available in a variety of lengths and desired tensile strength.

Figure 5:
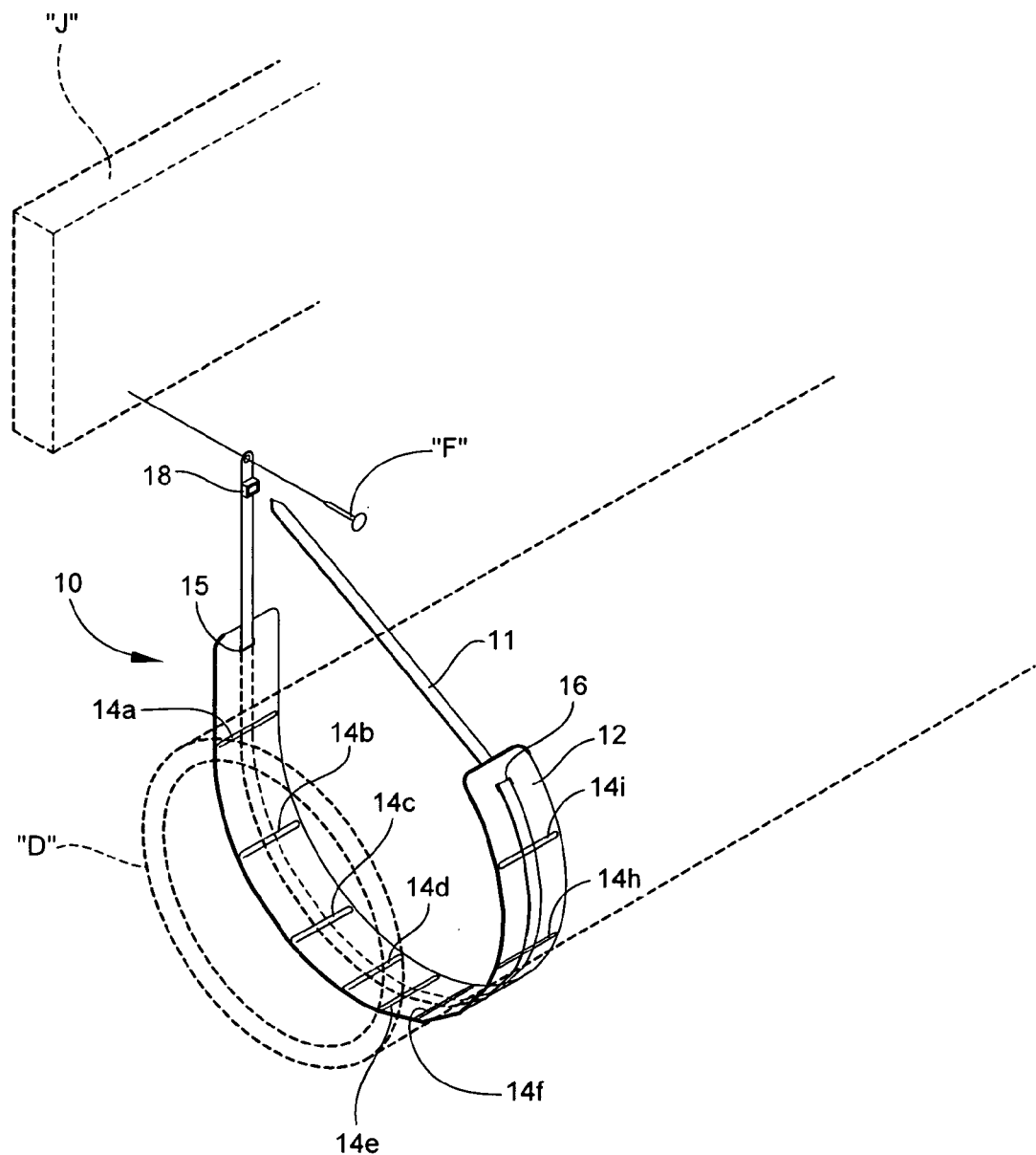
FIG. 5 is a perspective view of the duct tie and saddle applied to the duct, and prior to attachment of the tie to the wood framing member.
Figure 6:
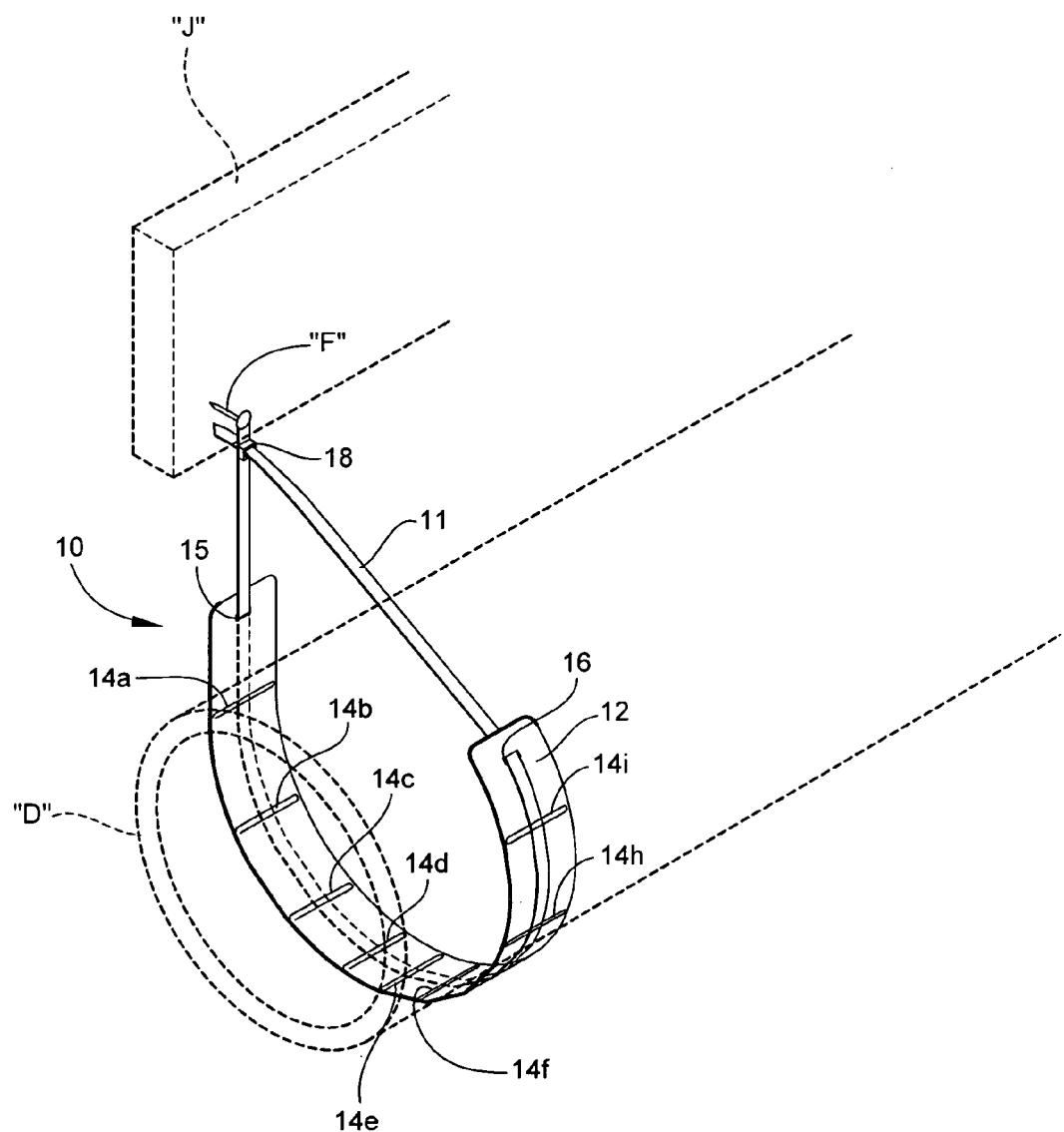
FIG. 6 is a perspective view of the duct tie and saddle applied to the duct, and showing attachment of the tie to the wood framing member.

As best shown in FIGS. 1–3, the duct saddle 10 comprises a generally flat and flexible saddle blank 12 formed of a molded UV-resistant polymer, such as nylon adapted to bend around the duct at least 180 degrees. The saddle blank 12 includes a number of lateral support ribs 14a–14i located on an inside major surface, and variably spaced-apart from one end of the blank 12 to the other. Respective tie openings 15 and 16 are formed at opposite ends of the saddle blank 12. As shown in FIG. 4, the duct tie 11 is threaded from one end through the tie openings 15, 16 in the saddle blank 12 such that the tie 11 extends adjacent an outside major surface of the blank 12 opposite the support ribs 14a–14i. The opposite end of the duct tie 11 includes a perforated mounting head 18 designed for receiving a nail, screw, or other fastener "F" into a supporting wood ceiling joist "J" or other framing member, as illustrated in FIGS. 5 and 6.

Figure 7:
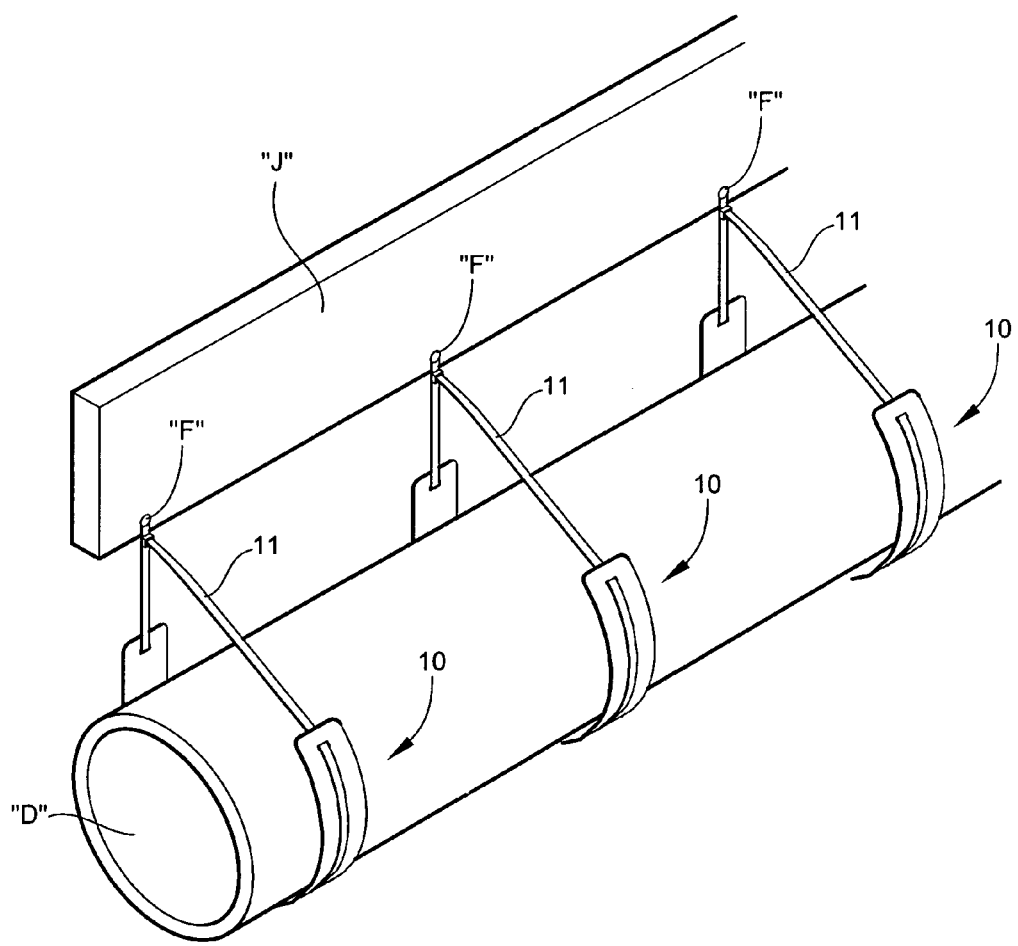
FIG. 7 is a perspective view showing a series of cooperating duct ties and saddles supporting the horizontal duct at predetermined intervals.

The duct saddle 10 is designed to slide along a length of the duct tie 11 in order to fully engage a lower circumference of the flexible duct "D" when hung. The relatively wide saddle blank 12 and lateral ribs 14a–14i cooperate to substantially prevent compression of the flexible duct "D" at the various points of suspension along its length. According to one embodiment, the width of the duct saddle 12 is 2.0 inches—preferably within the range of 1.5 to 3.0 inches. The ribs 14a–14i are more closely spaced within an intermediate region of the blank 12 to provide maximum resistance against sagging, crimping, pinching, or other compression of the duct "D" in an area of maximum vertical load. For example, in a 17-inch duct saddle, the spacing between center rib 14e and ribs 14d and 14f is 0.5 inches; between ribs 14d and 14c, and 14f and 14g is 1.0 inches; between ribs 14c and 14b, and 14g and 14h is 2.0; between ribs 14b and 14a, and 14h and 14i is 3.0 inches; and between rib 14a and one end of the blank 12, and 14i and the opposite end of the blank 12 is 2.0 inches. FIG. 7 shows the flexible air duct "D" suspended from the framing member "J", and fully supported at predetermined intervals by respective pairs of duct ties 11 and saddles 10.

Figure 8:
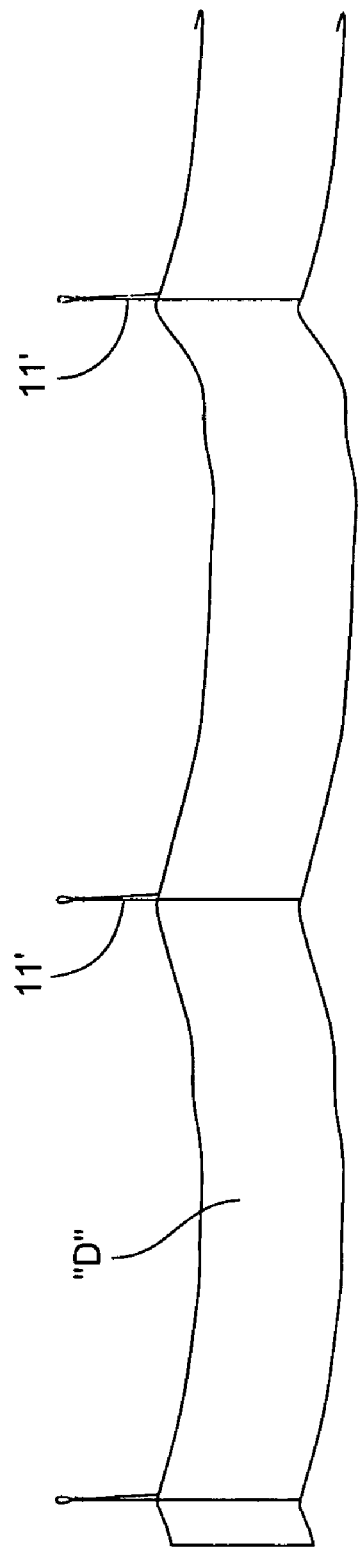
FIG. 8 is a view illustrating a typical, prior art installation of horizontal flexible duct using only standard duct ties.

A common air duct installation according to the prior art is illustrated in FIG. 8. The air duct "D" is hung using only a series of spaced-apart standard ties 11'. The areas of sag constrict the air passage through the duct "D", and reduce the overall efficiency of the furnace and air conditioning unit.

A further embodiment of a duct saddle 30 according to the present invention is illustrated in FIGS. 9 and 10. The saddle 30 is adapted for use in combination with a standard duct tie 31, as previously described. The saddle 30 comprises a generally flat and flexible saddle blank 32 formed of a molded UV-resistant polymer. A number of lateral reinforcing cross-members 34, 35, and 36 are formed with an outside major surface of the blank 32, each cross-member 34, 35, 36 including a tie opening for receiving the duct tie 31 as indicated at arrow 38. The inside major surface of the blank 32 may further include lateral ribs (not shown) for added lateral reinforcement.

A duct saddle for hanging flexible air duct is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A laterally-reinforced duct saddle adapted for hanging a length of horizontal flexible duct from a supporting structure, said duct saddle comprising:
   (a) a generally flat, elongated blank adapted for bending around the flexible duct at least 180 degrees, and having an intermediate region adapted for engaging the duct in an area of maximum vertical load; and
   (b) a plurality of lateral support ribs variably spaced-apart from one end of said blank to the other, said ribs being more closely spaced within the intermediate region of said blank to provide maximum resistance against compression of the flexible duct in the area of maximum vertical load.

2. A duct saddle according to claim 1, wherein said blank defines opposing end openings adapted for receiving a flexible duct tie cooperating to hang the duct from the supporting structure.

3. A duct saddle according to claim 2, wherein said blank is adapted for sliding position adjustment along a length of the duct tie.

4. A duct saddle according to claim 1, wherein said blank comprises a flexible polymer.

5. A duct saddle according to claim 1, wherein said ribs project from an inside major surface of said blank and are adapted for residing against the flexible duct.

6. A duct saddle according to claim 5, wherein said ribs project from the inside major surface a distance greater than 0.125 inches.

7. In combination with a duct tie adapted for hanging a length of horizontal flexible duct from a supporting surface, a laterally-reinforced duct saddle carried on said tie and comprising:
   (a) a generally flat, elongated blank adapted for bending around the flexible duct at least 180 degrees, and having an intermediate region adapted for engaging the duct in an area of maximum vertical load; and
   (b) a plurality of lateral support ribs variably spaced-apart from one end of said blank to the other, said ribs being more closely spaced within the intermediate region of said blank to provide maximum resistance against compression of the flexible duct in the area of maximum vertical load.

8. A combination according to claim 7, wherein said blank defines opposing end openings receiving said duct tie, said duct tie and duct saddle cooperating to hang the duct from the supporting structure.

9. A combination according to claim 8, wherein said duct saddle is adapted for sliding position adjustment along a length of said duct tie.

10. A combination according to claim 7, wherein said duct saddle comprises a flexible polymer.

11. A combination according to claim 7, wherein said ribs project from an inside major surface of said blank and are adapted for residing against the flexible duct.

12. A combination according to claim 11, wherein said ribs project from the inside major surface of said blank a distance greater than 0.125 inches.

13. A combination according to claim 7, wherein said duct tie comprises a mounting head adapted for receiving a fastener therethrough and into the supporting structure.

14. In combination with horizontal flexible duct, a duct tie cooperating with a laterally-reinforced duct saddle to hang a length of said duct from a supporting surface, said duct saddle comprising:
(a) a generally flat, elongated blank adapted for bending around the flexible duct at least 180 degrees, and having an intermediate region adapted for engaging the duct in an area of maximum vertical load; and
(b) a plurality of lateral support ribs variably spaced-apart from one end of said blank to the other, said ribs being more closely spaced within the intermediate region of said blank to provide maximum resistance against compression of the flexible duct in the area of maximum vertical load.

15. A combination according to claim 14, wherein said blank defines opposing end openings receiving said duct tie, said duct tie and duct saddle cooperating to hang the duct from the supporting structure.

16. A combination according to claim 15, wherein said duct saddle is adapted for sliding position adjustment along a length of the duct tie.

17. A combination according to claim 14, wherein said duct saddle comprises a flexible polymer.

18. A combination according to claim 14, wherein said ribs project from an inside major surface of said blank and reside against said flexible duct.

19. A combination according to claim 18, wherein said ribs project from the inside major surface of said blank a distance greater than 0.125 inches.

20. A combination according to claim 14, wherein said duct tie comprises a mounting head adapted for receiving a fastener therethrough and into the supporting structure.

* * * * *